(12) United States Patent
Wolleschensky et al.

(10) Patent No.: US 6,594,074 B1
(45) Date of Patent: Jul. 15, 2003

(54) MICROSCOPE, ESPECIALLY LASER SCANNING MICROSCOPE WITH ROTATABLE INTERFERENCE FILTERS

(75) Inventors: Ralf Wolleschensky, Schoeten (DE); Ulrich Simon, Rothenstein (DE); Michael Stock, Apolda (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/366,883

(22) Filed: Aug. 4, 1999

(51) Int. Cl.⁷ .............................................. G02B 21/06
(52) U.S. Cl. ...................................... 359/385; 359/388
(58) Field of Search ................................ 359/385, 890, 359/578, 889, 891, 885, 388, 588, 589, 234, 235, 236, 515, 16, 368; 372/23, 98, 9, 19; 351/213, 217, 233, 234

(56) References Cited

U.S. PATENT DOCUMENTS

| | | | |
|---|---|---|---|
| 5,194,912 A | * 3/1993 | Batchelder et al. ......... | 137/270 |
| 5,210,657 A | * 5/1993 | Komazawa et al. ......... | 359/885 |
| 5,371,624 A | * 12/1994 | Nagano et al. ............. | 359/385 |
| 5,473,412 A | * 12/1995 | Ozawa ........................ | 355/77 |
| 5,481,402 A | * 1/1996 | Cheng et al. ............... | 359/498 |
| 5,710,663 A | * 1/1998 | Kawasaki .................... | 359/368 |
| 5,956,416 A | * 9/1999 | Tsuruoka et al. ........... | 382/128 |

* cited by examiner

*Primary Examiner*—Mark A. Robinson
*Assistant Examiner*—Lee Fineman
(74) *Attorney, Agent, or Firm*—Reed Smith LLP

(57) ABSTRACT

A microscope, especially a laser scanning microscope, with illumination over one wavelength and/or a plurality of wavelengths, wherein a controlling of the intensity of at least one wavelength is carried out by at least one rotatable interference filter which is arranged in the illumination beam path, wherein the at least one wavelength is at least partially reflected out of the illumination beam path and a plurality of filters for different wavelengths can be arranged one behind the other in the illumination beam path.

8 Claims, 3 Drawing Sheets

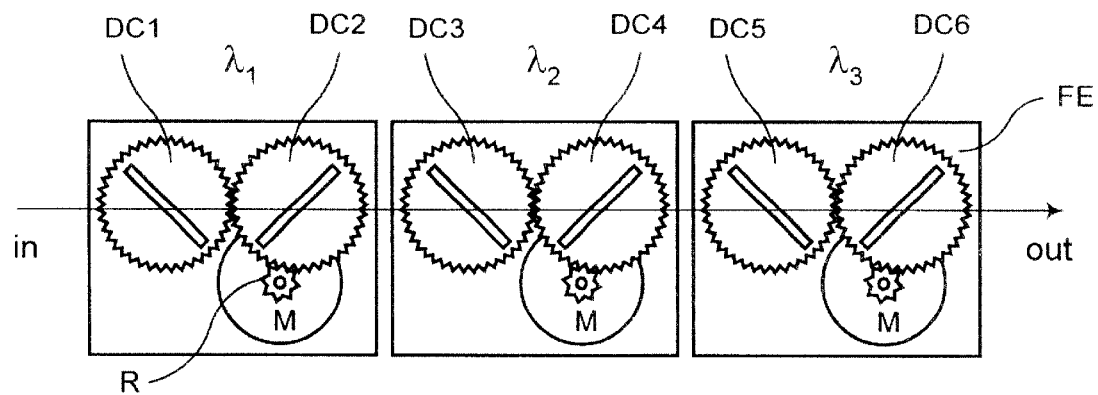
F I G. 2A
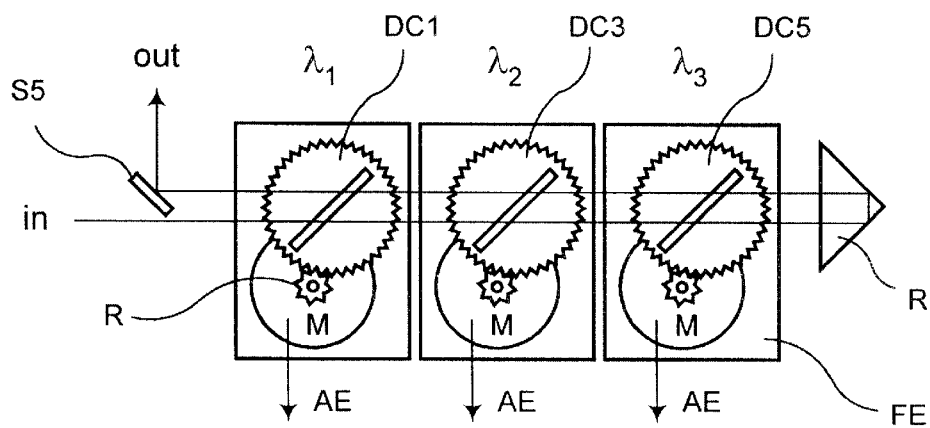
F I G. 2B

MICROSCOPE, ESPECIALLY LASER SCANNING MICROSCOPE WITH ROTATABLE INTERFERENCE FILTERS

BACKGROUND OF THE INVENTION

FIELD OF THE INVENTION

The invention relates to laser scanning microscopes and, in particular, an improvement in such microscopes for controlling the intensity of one wavelength of illumination.

OBJECT AND SUMMARY OF THE INVENTION

The primary object of the invention is to provide an improvement in laser scanning microscopes where the intensity of one wavelength of illumination is controlled.

In accordance with the invention, a microscope, especially a laser scanning microscope, comprises means for providing illumination over at least one of a single wavelength and a plurality of wavelengths and means for controlling the intensity of at least one wavelength being carried out by at least one rotatable interference filter which is arranged in an illumination beam path. The at least one wavelength is at least partially reflected out of the illumination beam path.

BRIEF DESCRIPTION OF THE DRAWINGS

In the drawings:

FIGS. 2a and 2b illustrate rotation of dichroics for influencing the wavelengths in accordance with the invention.

DESCRIPTION OF THE PREFERRED EMBODIMENTS

Figure 1:
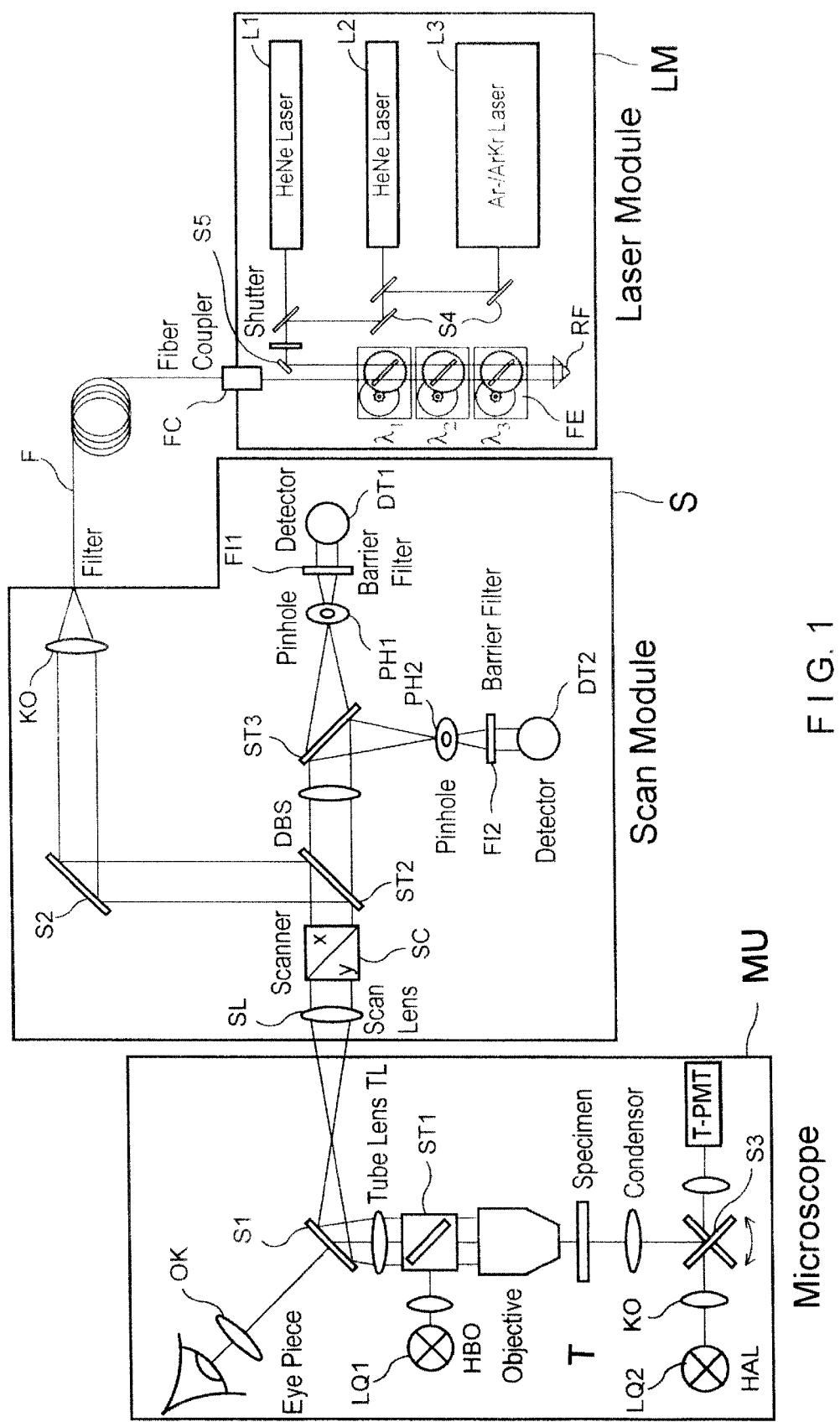
FIG. 1 illustrates a microscope unit and scan head of a laser scanning microscope.

A microscope unit MU and a scan head S connected thereto are shown schematically in FIG. 1.

A light source LQ1 with illumination optics illuminating the object on the microscope stage T via a beam splitter ST1 in a conventional manner is provided in the microscope.

A swivelable mirror S3 serves to switch to transmitted-light illumination by means of a light source LQ2 via the condensor KO.

Observation through an eyepiece OK is carried out via a tube lens TL and a mirror S1. In addition, by means of this mirror or beam splitter S1, the scanning beam path is coupled in via the scanning lens SL and the scanner SC.

The light of a laser module LM is coupled in the direction of the scanner SC via light conductor F, collimating optics KO, mirror S2 and beam splitter ST2.

The light coming from the object travels through the scanner SC and dichroic beam splitter ST2 in the direction of detection, represented herein by way of example by another beam splitter ST3 for splitting into detection beam paths with pinholes PH1, 2, filters FI1, 2 and detectors DT1, 2.

A plurality of lasers L1, L2, L3 with different wavelengths are provided in the laser module; these lasers L1, L2, L3 can also be multiline lasers. They are combined via mirrors and beam splitter S4, respectively, and coupled into a coupling-in unit FC in the light conductor F.

Before being coupled in, they pass a mirror S5 and a filter unit FE, as is shown in FIG. 2b, and are deflected, again via a filter unit FE, in the direction of the coupling-in unit by a reflector RF.

Dichroics DC1, 2, 3, 4, 5, 6 which have a wavelength-dependent and angle-dependent reflectivity are arranged in the filter unit FE. This is shown by way of example in FIG. 3 with reference to the angle-dependent reflectivity for the three wavelengths in which the mirror coating is optimized for 45 degrees, i.e., the greatest reflectivity for a determined wavelength occurs at 45 degrees. Therefore, the transmission is adjusted in a continuous manner for the respective wavelength by rotation. The rest of the wavelengths are not affected.

The optimization at 45 degrees is given by way of example; other angles could also be selected for the greatest reflectivity.

The light component that is reflected out is suppressed in a suitable manner, for example, by light traps. Since the rotation of the dichroics generates a beam offset, these dichroics are arranged in pairs for compensation.

Figure 3:
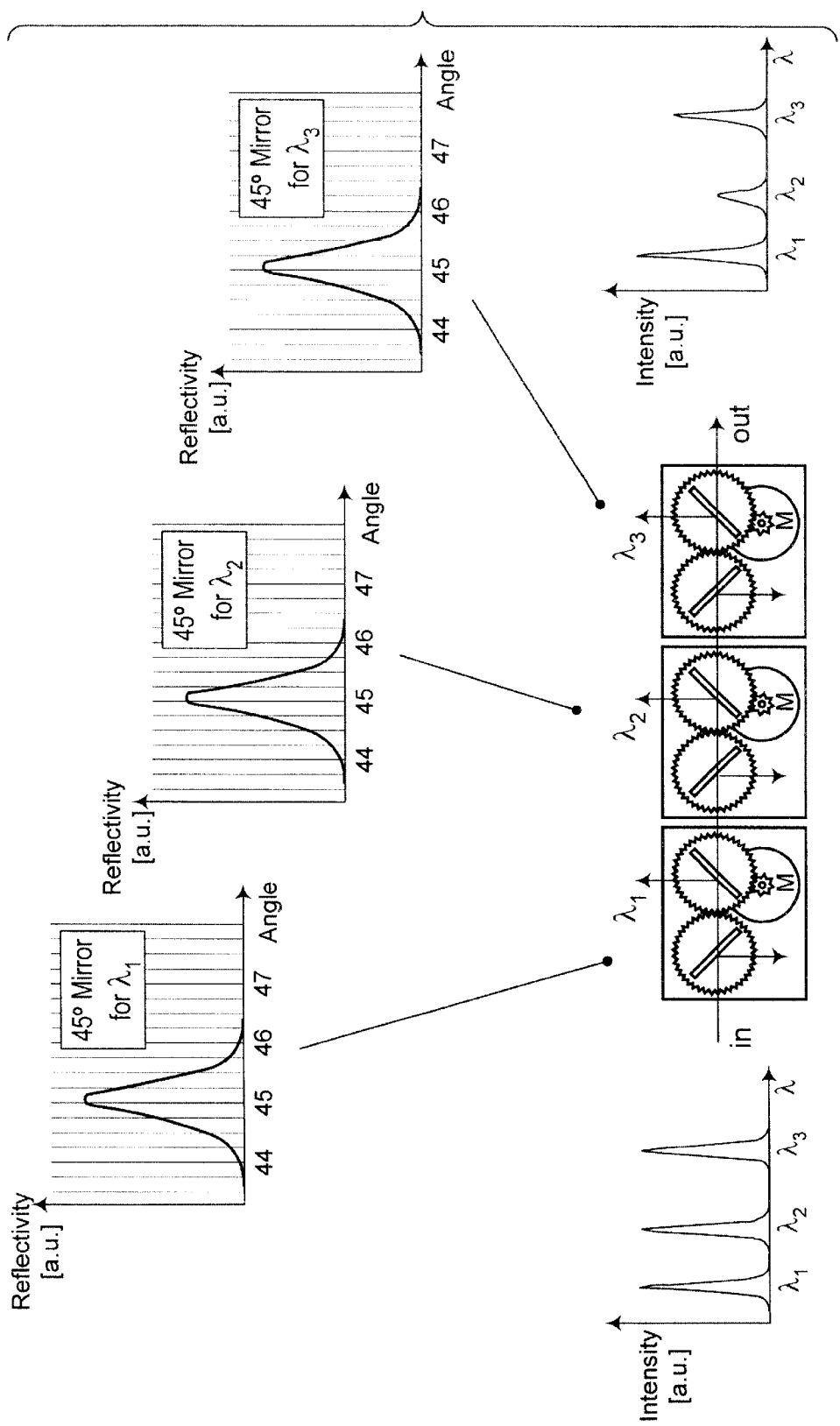
FIG. 3 illustrates in schematic and pictorial the effect of the invention on chosen wavelengths.

In FIGS. 2a and 3, pairs of dichroics DC1, 2 for a wavelength $\lambda 1$, DC3, 4 for a wavelength $\lambda 2$, and DC5, 6 for a wavelength $\lambda 3$ are arranged in a continuous beam path so as to be selectively reflecting and can accordingly influence these wavelengths and compensate the beam offset by means of the paired arrangement.

FIG. 2b shows another arrangement as in FIG. 1, wherein the beam offset is compensated by passing twice through the dichroics DC1, DC3, DC5 for the three wavelengths.

The driving means for the rotation of the dichroics are carried out in a manner familiar to the person skilled in the art, in this case, as is shown schematically in FIGS. 2a and b, by toothed wheels to which the dichroics are fastened, wherein the toothed wheels of the pairs of dichroics in FIG. 2a mesh with one another and accordingly ensure a coupled movement of the pairs of toothed wheels.

A pinion R which is driven by a motor M is provided for driving the toothed wheels. The driving of the motors can be carried out via a central control unit AE which, for example, controls a predetermined illumination and detection mode which includes the attenuation/adjustment of determined laser wavelengths.

In a multi-wavelength laser, or when a plurality of laser wavelengths are coupled into a microscope jointly, especially in a laser scanning microscope, one or more wavelengths can advantageously be adjusted, i.e., attenuated, continuously with respect to intensity. If the lasers should be exchangeable, a plurality of such interchangeable filter units with different wavelengths can also be provided.

The dichroics utilized herein are interference filters such as those supplied, for example, by Laseroptik GmbH, also in pairs for compensating beam offset. Further, dichroics of the above-mentioned type can also be used advantageously for wavelength-dependent influencing of the detection beam path, for example, in FIG. 1, in a detection beam path following the beam splitter ST2 for the suppression of especially unwanted wavelengths, for example, of the excitation wavelength in fluorescence detection.

While the foregoing description and drawings represent the preferred embodiments of the present invention, it will be obvious to those skilled in the art that various changes and modifications may be made therein without departing from the true spirit and scope of the present invention.

What is claimed is:

1. A microscope, comprising:

means for providing illumination containing a plurality of wavelengths; and means for controlling the intensity of said plurality of wavelengths being carried out by a plurality of rotatable interference filters that are arranged in an illumination beam path, at least one of said plurality of wavelengths being at least partially reflected out of the illumination beam path and each of plurality of rotatable interference filters being capable of controlling a corresponding wavelength of said plurality of wavelengths independent of other wavelengths of said plurality of wavelengths;

wherein at least one filter is traversed twice in that a reflector returns the illumination light via the at least one filter.

2. The microscope according to claim 1, wherein said plurality of filters for said plurality of wavelengths are arranged one behind the other in the illumination beam path.

3. The microscope according to claim 1, wherein at least one of said plurality of rotatable interference filters comprises first and second rotatable interference filters with identical wavelength characteristics for compensating a beam offset.

4. A method for controlling intensity of a plurality of laser wavelengths coupled jointly in a laser scanning microscope comprising the steps of:

providing an illumination containing a plurality of wavelengths; and adjusting the intensity of the wavelengths by a plurality of rotatable interference filters, wherein each rotatable interference filter is capable of adjusting the intensity of a corresponding wavelength of said plurality of wavelengths independent of other wavelengths of said plurality of wavelengths, and wherein an illumination light passing through at least one of the filters is reflected back toward the at least one filter to compensate for beam offset.

5. A method for controlling a microscope, comprising the steps of:

providing a rotatable filtering mechanism arranged in the path of an illumination containing a plurality of wavelengths; said rotatable filtering mechanism including a plurality of rotatable filters with each being capable of adjusting the intensity of a corresponding wavelength of said plurality of wavelengths independent of other wavelengths of said plurality of wavelengths;

rotating said rotatable filters to adjust the intensity of said illumination, wherein an illumination light passing through at least one of the filters is reflected back toward the at least one filter to compensate for beam offset.

6. A microscope, comprising:

an illumination source operable to provide an illumination containing a plurality of wavelengths;

a filter unit coupled to the illumination source and including a plurality of rotatable interference filters, each filter being operable to adjust the intensity of a corresponding one of the plurality of wavelengths independent of other wavelengths; and a reflector operable to reflect the illumination light passing through at least one of the filters back toward the at least one filter to compensate for beam offset.

7. The microscope according to claim 6, wherein the filter unit is disposed to receive light coming from a sample toward a fluorescence detector in order to suppress excitation wavelengths.

8. The microscope according to claim 6 wherein the plurality of rotatable interference filters in the filter unit are arranged in series with each other in the illumination beam path.

* * * * *